(12) United States Patent
Hashida et al.

(10) Patent No.: US 9,908,492 B2
(45) Date of Patent: Mar. 6, 2018

(54) VEHICLE BODY FRAMEWORK STRUCTURE

(71) Applicant: TOYOTA JIDOSHA KABUSHIKI KAISHA, Toyota-shi, Aichi-ken (JP)

(72) Inventors: Shigenori Hashida, Toyota (JP); Shintaro Kitakata, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/214,903

(22) Filed: Jul. 20, 2016

(65) Prior Publication Data

US 2017/0072885 A1    Mar. 16, 2017

(30) Foreign Application Priority Data

Sep. 14, 2015   (JP) .................. 2015-180633

(51) Int. Cl.
| | |
|---|---|
| *B60R 19/18* | (2006.01) |
| *B62D 21/15* | (2006.01) |
| *B62D 25/08* | (2006.01) |

(52) U.S. Cl.
CPC ............ *B60R 19/18* (2013.01); *B62D 21/152* (2013.01); *B62D 25/08* (2013.01); *B62D 21/15* (2013.01)

(58) Field of Classification Search
CPC ...... B60R 19/18; B62D 25/08; B62D 21/152; B62D 21/15
USPC ........................................................ 293/102
See application file for complete search history.

(56) References Cited

U.S. PATENT DOCUMENTS

| | | |
|---|---|---|
| 4,391,464 A | 7/1983 | Masotti et al. |
| 5,507,540 A | 4/1996 | Pemot |
| 6,082,811 A * | 7/2000 | Yoshida ................ B21C 23/205 296/146.6 |

(Continued)

FOREIGN PATENT DOCUMENTS

| | | |
|---|---|---|
| JP | S64-049482 U | 3/1989 |
| JP | 2004-345466 A | 12/2004 |

(Continued)

OTHER PUBLICATIONS

Dec. 5, 2017 Office Action issued in Japanese Application No. 2015-180633.

Primary Examiner — Joseph D. Pape
Assistant Examiner — Dana D Ivey
(74) Attorney, Agent, or Firm — Oliff PLC

(57) ABSTRACT

A vehicle body framework structure includes an elongated hollow framework member and a reinforcement member disposed within the hollow framework member, the reinforcement member including a first contact portion that contacts a first internal face of an opposing pair of internal faces of the framework member, a second contact portion that contacts a second internal face of the opposing pair of internal faces, and a coupling portion that couples the first contact portion to the second contact portion. At least one slit is formed in at least the second contact portion and the coupling portion of the reinforcement member, the slit extending from an end portion on the second internal face side of the reinforcement member toward the first internal face side of the reinforcement member and having a depth that is greater than or equal to one fourth of a spacing between the pair of internal faces.

15 Claims, 6 Drawing Sheets

(56) References Cited

U.S. PATENT DOCUMENTS 7,261,345 B2 * 8/2007 Akad .................. B60R 19/20
                                                                    293/109
2006/0175848 A1    8/2006   Akad

FOREIGN PATENT DOCUMENTS

JP       2006-001449 A    1/2006
JP       2008-024019 A    2/2008

* cited by examiner

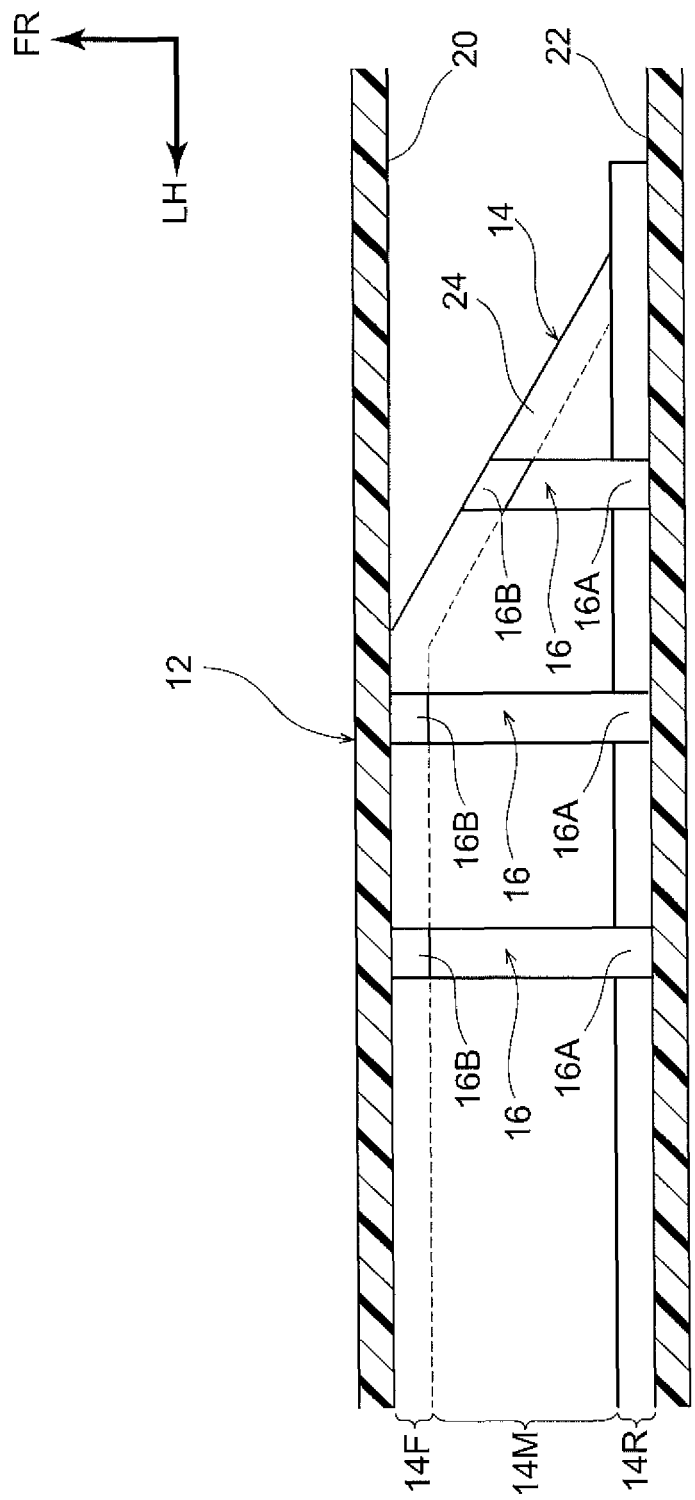

VEHICLE BODY FRAMEWORK STRUCTURE

CROSS-REFERENCE TO RELATED APPLICATION

This application is based upon and claims the benefit of priority of the prior Japanese Patent Application No. 2015-180633, filed on Sep. 14, 2015, the entire contents of which are incorporated herein by reference.

FIELD

The embodiments discussed herein are related to a vehicle body framework structure.

BACKGROUND

Japanese Patent Application Laid-Open (JP-A) No. 2008-24019 describes a structure in which a reinforcement member is built into a hollow shaped elongated bumper member (hollow framework member).

However, in cases in which the above known structure is applied to a bumper member made of carbon-fiber reinforced plastic (CFRP) or a bumper member made of aluminum alloy, it is conceivable that the bumper member breaks or yields at a portion located at an end of the inbuilt reinforcement member.

In consideration of the above circumstances, in a vehicle body framework structure in which a reinforcement member is built into a hollow framework member, an object of the embodiments is to provide a vehicle body framework structure in which breaking or yielding of the framework member is suppressed.

SUMMARY

A vehicle body framework structure according to a first aspect includes an elongated hollow framework member, and a reinforcement member disposed within the hollow framework member, the reinforcement member including a first contact portion that contacts a first internal face of an opposing pair of internal faces of the hollow framework member, a second contact portion that contacts a second internal face of the opposing pair of internal faces, and a coupling portion that couples the first contact portion to the second contact portion. At least one slit is formed in at least the second contact portion and the coupling portion of the reinforcement member, the at least one slit extending from an end portion on the second internal face side of the reinforcement member toward the first internal face side of the reinforcement member, and the slit having a depth that is greater than or equal to one fourth of a spacing between the pair of internal faces.

The vehicle body framework structure according to the first aspect includes the reinforcement member including the first contact portion, the second contact portion, and the coupling portion. The first contact portion contacts the first internal face of the opposing pair of internal faces of the hollow framework member and the second contact portion contacts the second internal face of the opposing pair of internal faces. The coupling portion couples the first contact portion to the second contact portion. The strength of the vehicle body framework structure is thereby improved with respect to compression force applied in the direction that the pair of internal faces oppose each other.

The at least one slit is formed in at least the second contact portion and the coupling portion of the reinforcement member, the slit extending from an end portion on the second internal face side of the reinforcement member toward the first internal face side of the reinforcement member and having a depth that is greater than or equal to one fourth of a spacing between the pair of internal faces. In this manner, the slit extending from the end portion on the second internal face side toward the first internal face side is formed in the reinforcement member such that the bending rigidity of the vehicle body framework structure at a portion where the slit is formed is reduced compared to a case in which the slit is not formed. Strain on the framework member can thereby be dispersed not only at the end portion of the reinforcement member in the framework member, but also at the portion of the framework member where the slit is formed in the reinforcement member. As a result, when load is input to the framework member in the direction that the pair of internal faces oppose each other and the framework member undergoes bending deformation, breaking or yielding of the framework member is suppressed, while maintaining the strength of the vehicle body framework structure with respect to compression force in the direction that the pair of internal faces oppose each other.

In the vehicle body framework structure according to a second aspect, the hollow framework member is a bumper reinforcement attached to front ends of a pair of front-rear direction members extending along a vehicle front-rear direction at both vehicle width direction sides of a vehicle front section, the bumper reinforcement extending along a vehicle width direction. A pair of the reinforcement members are provided such that, in each of the reinforcement members, the first contact portion faces a vehicle front direction and the second contact portion faces a vehicle rear direction, and each of the reinforcement members includes a portion present at one of the two respective vehicle width direction ends of the bumper reinforcement and facing toward a front end of the respective front-rear direction member. The at least one slit of each of the reinforcement members is formed further toward a vehicle width direction inner side than each of the respective portions facing toward front ends of the front-rear direction members.

In the vehicle body framework structure according to the second aspect, the pair of reinforcement members each include a portion that is present at one of the two vehicle width direction ends of the bumper reinforcement and that faces toward a front end of the respective front-rear direction member. Each reinforcement member is provided with the first contact portion facing in the vehicle front direction and the second contact portion facing in the vehicle rear direction. Thus, for example, in cases in which a vehicle is in an offset collision, cross-sectional collapse of the bumper reinforcement can be suppressed at both ends of the bumper reinforcement, and collision load can be efficiently transmitted to the respective front-rear direction member.

In the vehicle body framework structure, the at least one slit of each of the reinforcement members is positioned further to the vehicle width direction inner side than the portions facing respective front ends of the front-rear direction members. Thus, for example, in cases in which the vehicle is in an offset collision and the bumper reinforcement bends, strain occurring in the bumper reinforcement can be dispersed not only at the vehicle width direction inside end portions of the reinforcement member of the bumper reinforcement, but also at the portions of the bumper reinforcement where the slits are provided, so as to suppress the bumper reinforcement from breaking or yielding.

As explained above, the vehicle body framework structure according to the first aspect is capable of suppressing the breaking or yielding of a hollow framework member in a vehicle body framework structure in which a reinforcement member is built into the framework member.

The vehicle body framework structure according to the second aspect is capable of suppressing the bumper reinforcement from breaking or yielding and is capable of efficiently transmitting collision load toward the front-rear direction member.

BRIEF DESCRIPTION OF DRAWINGS

FIG. 3 is an enlarged cross-section of the vehicle framework structure of FIG. 1, illustrating a state in which a framework member has been cut away along a horizontal direction at an up-down direction intermediate portion.

FIG. 4A illustrates a front face side of a framework member in a concave deformed state, and FIG. 4B illustrates a rear face side of a framework member in a concave deformed state.

DESCRIPTION OF EMBODIMENTS

First Exemplary Embodiment

Explanation follows regarding a first exemplary embodiment, with reference to FIGS. 1 to 4B. Note that in the following explanation, for ease of explanation, a ease will be described in which a length direction of a framework member 12 is in a left-right direction. The arrow UP indicates the up direction, the arrow FR indicates the front direction (for example, relative to a vehicle having the framework member), the arrow RH indicates the right direction, and he arrow LH indicates the left direction in each of the drawings.

Overall Configuration

Figure 1:
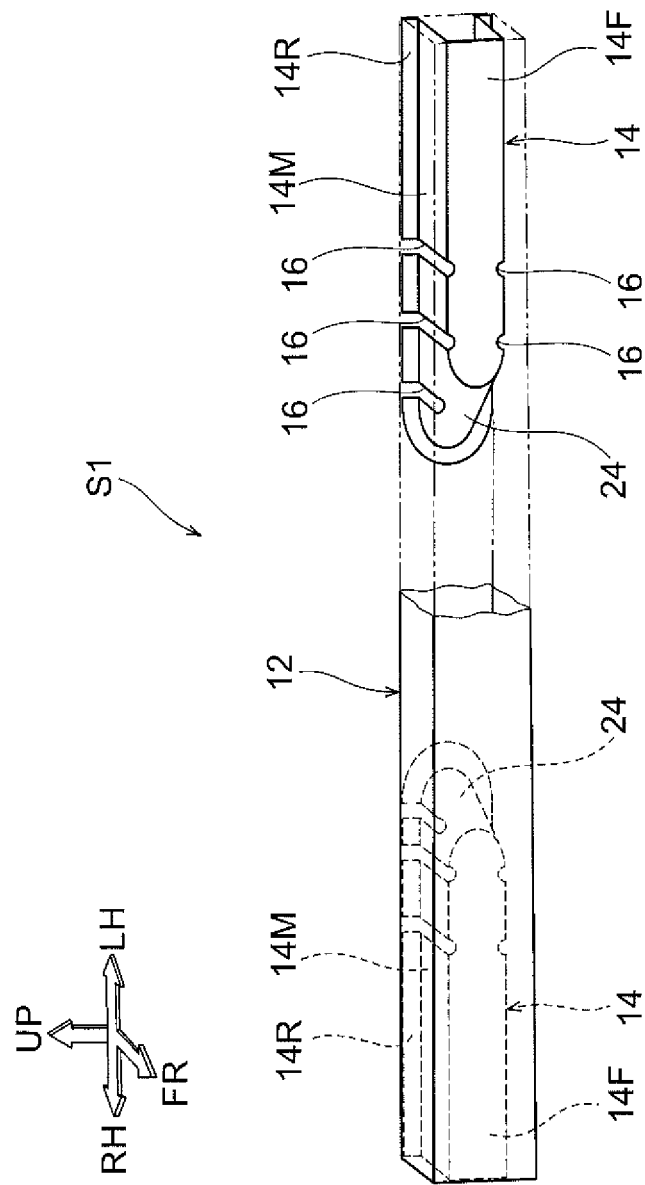
FIG. 1 is a perspective view illustrating a partial cutaway of a framework member, and illustrates an overall configuration of a vehicle framework structure of a first exemplary embodiment.

FIG. 1 illustrates a vehicle body framework structure S1 of the first exemplary embodiment. As illustrated in FIG. 1, the vehicle body framework structure S1 includes a hollow framework member 12 and reinforcement members 14 provided inside the framework member 12. The material of both the framework member 12 and the reinforcement members 14 is a carbon-fiber reinforced plastic (referred to hereafter as "CFRP").

Framework Member

The framework member 12 is an elongated member that has a substantially rectangular cross-section profile and includes an interior space. FIG. 3 illustrates a state in which the framework member 12 has been cut away along a horizontal direction at an up-down direction intermediate portion. As illustrated in FIG. 3, an internal front face 20 (one internal face or a first internal face) and an internal rear face 22 (another internal face or a second internal face) of the framework member 12 oppose each other in the front-rear direction. In the following explanation of the reinforcement member 14, the front direction side refers to the front face 20 side, and the rear direction side refers to the rear face 22 side.

Reinforcement Member

Figure 2:
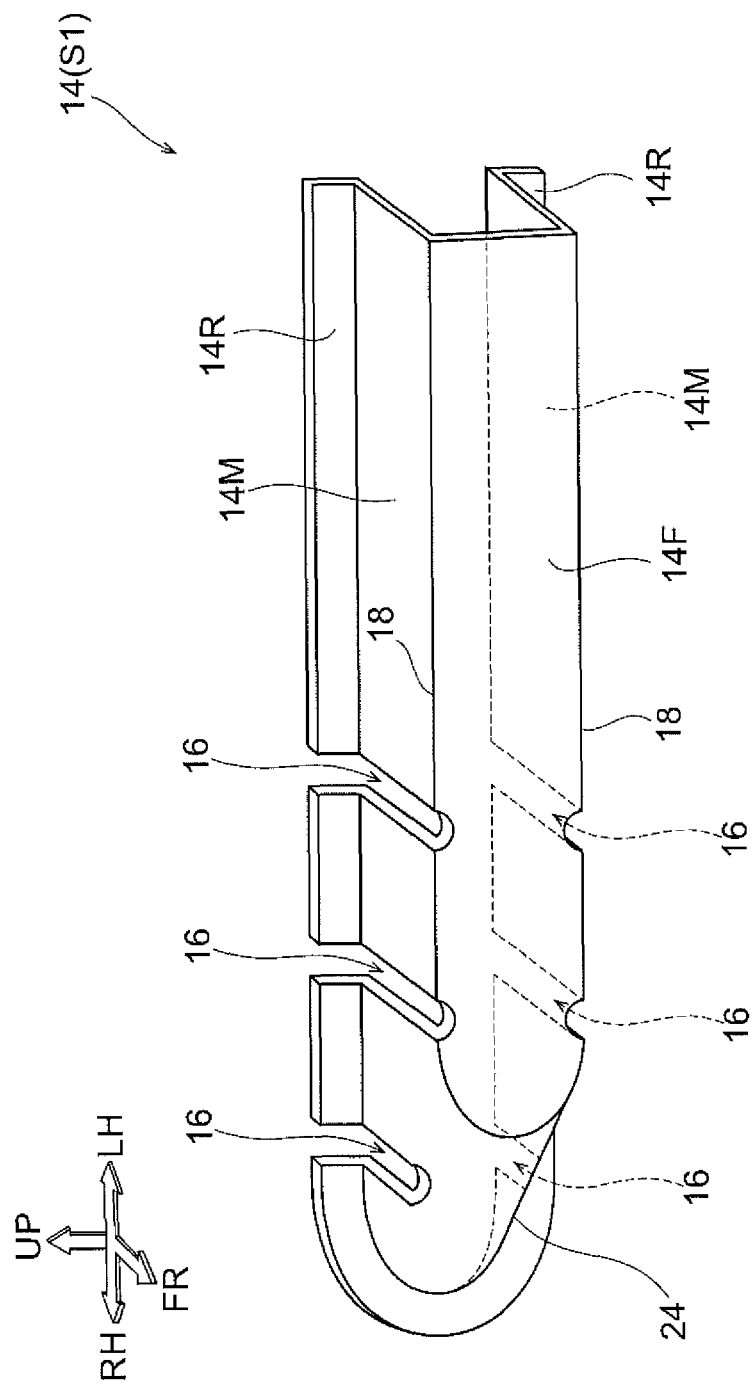
FIG. 2 is an enlarged perspective view illustrating the reinforcement member of FIG. 1.
Figure 4A:
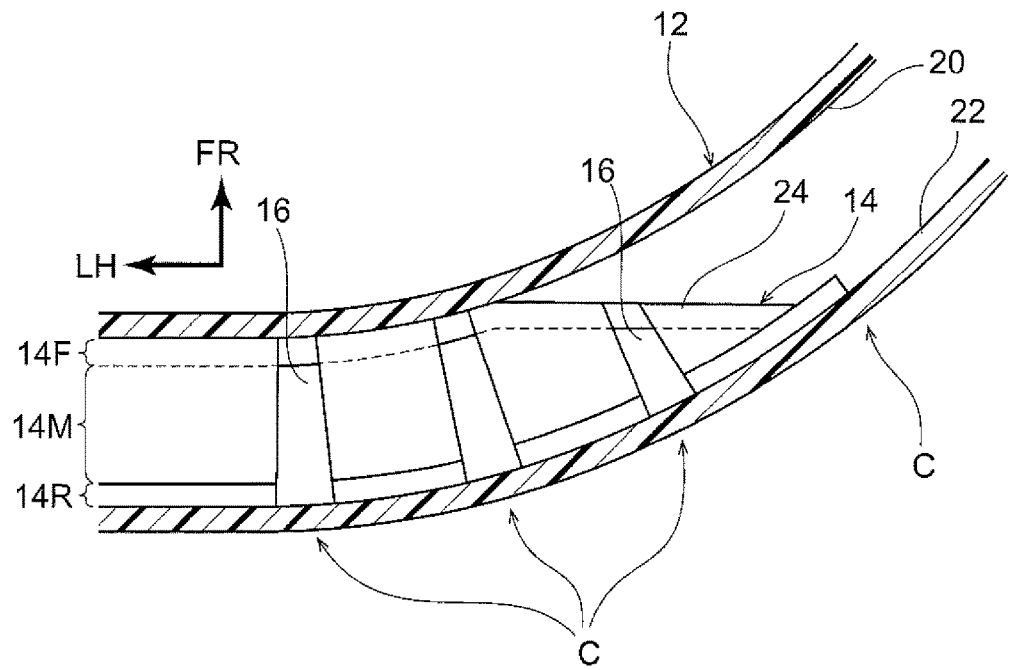
FIGS. 4A and 4B illustrate bending deformation of a vehicle body framework structure of the first exemplary embodiment.
Figure 4B:
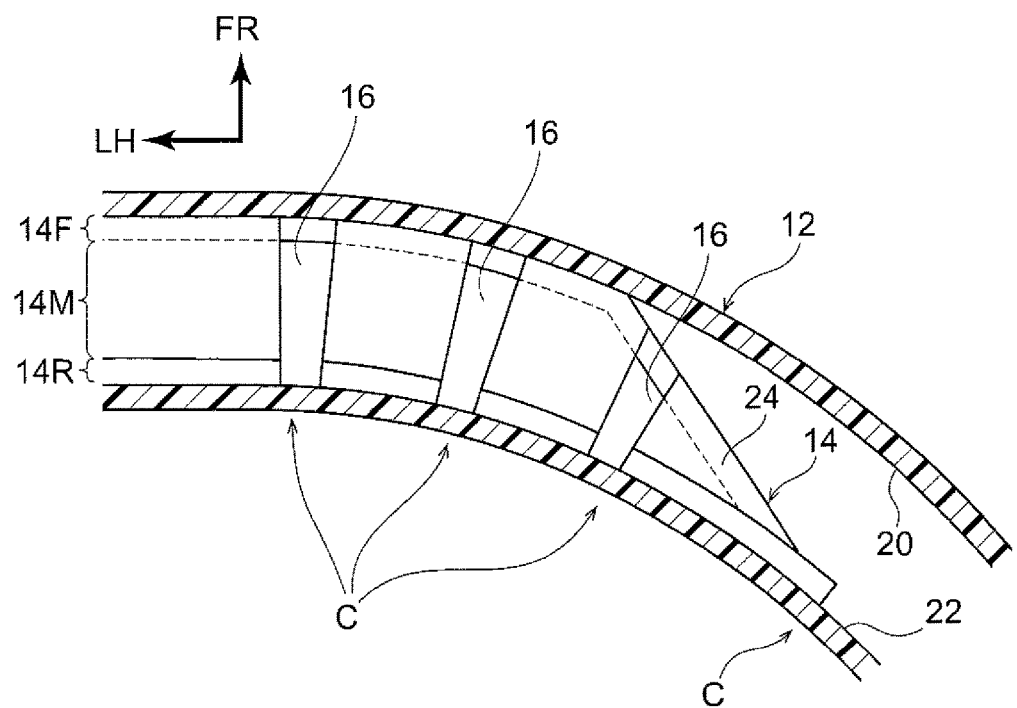

As illustrated in FIG. 1, the reinforcement members 14 are provided at internal portions of the framework member 12, at both length direction end portions of the framework member 12. FIG. 2 illustrates an enlarged reinforcement member 14. As illustrated in FIG. 2, each reinforcement member 14 has what is referred to as a hat shape. Namely, each reinforcement member 14 includes a sheet shaped first contact portion 14F disposed extending in the up-down direction and the left-right direction, a pair of sheet shaped coupling portions 14M respectively provided extending from both up-down direction end portions of the first contact portion 14F toward the rear side, and disposed extending in the front-rear direction and the left-right direction, and a pair of sheet shaped second contact portions 14R provided extending from respective rear side end portions of the pair of coupling portions 14M toward the upper direction and the lower direction, and disposed extending in the up-down direction and the left-right direction.

As illustrated in FIG. 3, the first contact portion 14F (the face on the front side thereof) makes contact with the internal front face 20 of the framework member 12. The second contact portions 14R (the faces on the rear side thereof) make contact with the internal rear face 22 of the framework member 12. In the present exemplary embodiment, the framework member 12 and the reinforcement member 14 are joined using vibration welding.

Moreover, slits 16 are formed in the reinforcement member 14. The slits 16 are formed in the reinforcement member 14 from an end portion on the rear face 22 side toward the internal front face 20 side. Namely, base ends 16A of the slits 16 are formed in the second contact portions 14R of the reinforcement member 14, and the slits 16 face toward the first contact portion 14F side. Leading ends 16B of the slits 16 reach as far as a boundary portion (ridge lines 18) between the coupling portion 14M and the first contact portion 14F.

Specifically, plural (six in the present exemplary embodiment) of the slits 16 are formed such that there are three slits 16 respectively formed in both the second contact portion 14R and the coupling portion 14M at the upper side, and in the second contact portion 14R and the coupling portion 14M at the lower side. As illustrated in FIG. 3, the slits 16 at the lower side and the slits 16 at the upper side are formed at positions that overlap with each other as viewed from above. The extension direction of the slits 16 is parallel to the front-rear direction (a direction in which the front face 20 and the rear face 22 oppose each other).

As illustrated in FIG. 2, the reinforcement member 14 has a shape with a cross-section profile that is opened in a hat shape at one end portion (a left side end portion) out of the two length direction end portions of the reinforcement member 14. An inclined portion 24 that is inclined toward the right side on progression from the front direction toward the rear direction is provided to another end portion (the right side end portion) out of the two length direction end portions of the reinforcement member 14. As illustrated in FIG. 3, the reinforcement member 14 thus has a shape that moves away from the front face 20 of the framework member 12 at the inclined portion 24. Note that configuration may be made in which the inclined portion 24 is not provided.

Operation and Advantageous Effects

Next, explanation follows regarding operation and advantageous effects of the present exemplary embodiment.

The vehicle body framework structure S1 of the present exemplary embodiment includes the reinforcement member 14 configured including the first contact portion 14F, the second contact portions 14R, and the coupling portions 14M. As illustrated in FIG. 3, out of these, the first contact portion 14F makes contact with the one internal face (the front face 20) out of the opposing pair of internal faces of the framework member 12, and the second contact portions 14R make contact with the other internal face (the rear face 22) out of the opposing pair of internal faces. The coupling portions 14M couple the first contact portion 14F and the second contact portions 14R together. The strength of the vehicle body framework structure S1 with respect to compression force acting in the direction that the pair of internal faces (front face 20, rear face 22) oppose each other (the front-rear direction) is thereby improved. In other words, cross-sectional collapse of the framework member 12 is suppressed.

The slits 16 are formed in the reinforcement member 14, extending from the end portion on the other internal face (the rear face 22) side toward the one internal face (the front face 20) side and having a depth substantially the same as that of the spacing at which the pair of internal faces (front face 20, rear face 22) oppose each other. By forming the slits 16 extending from the end portion on the other internal face side toward the one internal face side in the reinforcement member 14 in this manner, the bending rigidity of the vehicle body framework structure S1 at portions where the slits 16 are formed is reduced compared to a case in which the slits 16 are not fainted. Strain on the framework member 12 illustrated by the arrows C in FIG. 4A and FIG. 4B can thereby be dispersed not only at the end portion of the reinforcement member 14 in the framework member 12, but also at the portions of the framework member 12 where the slits 16 are formed in the reinforcement member 14. As a result, breaking or yielding of the framework member 12 is suppressed when load is input to the framework member in the direction that the pair of internal faces (front face 20, rear face 22) oppose each other, and the framework member undergoes bending deformation.

In the vehicle body framework structure S1 of the present exemplary embodiment, the leading ends 16B of the slits 16 reach as far as the boundary portion (the ridge lines 18) between the coupling portions 14M and the first contact portion 14F. At the portions of the reinforcement member 14 where the slits 16 are formed, the reinforcement member 14 is thereby configured by the first contact portion 14F alone. In this manner, the bending rigidity of the vehicle body framework structure S1 is efficiently reduced due to the reinforcement member 14 being configured, where the slits 16 are formed, by the first contact portion 14F alone that makes contact with the front face 20 of the framework member 12.

Second Exemplary Embodiment

Figure 5:
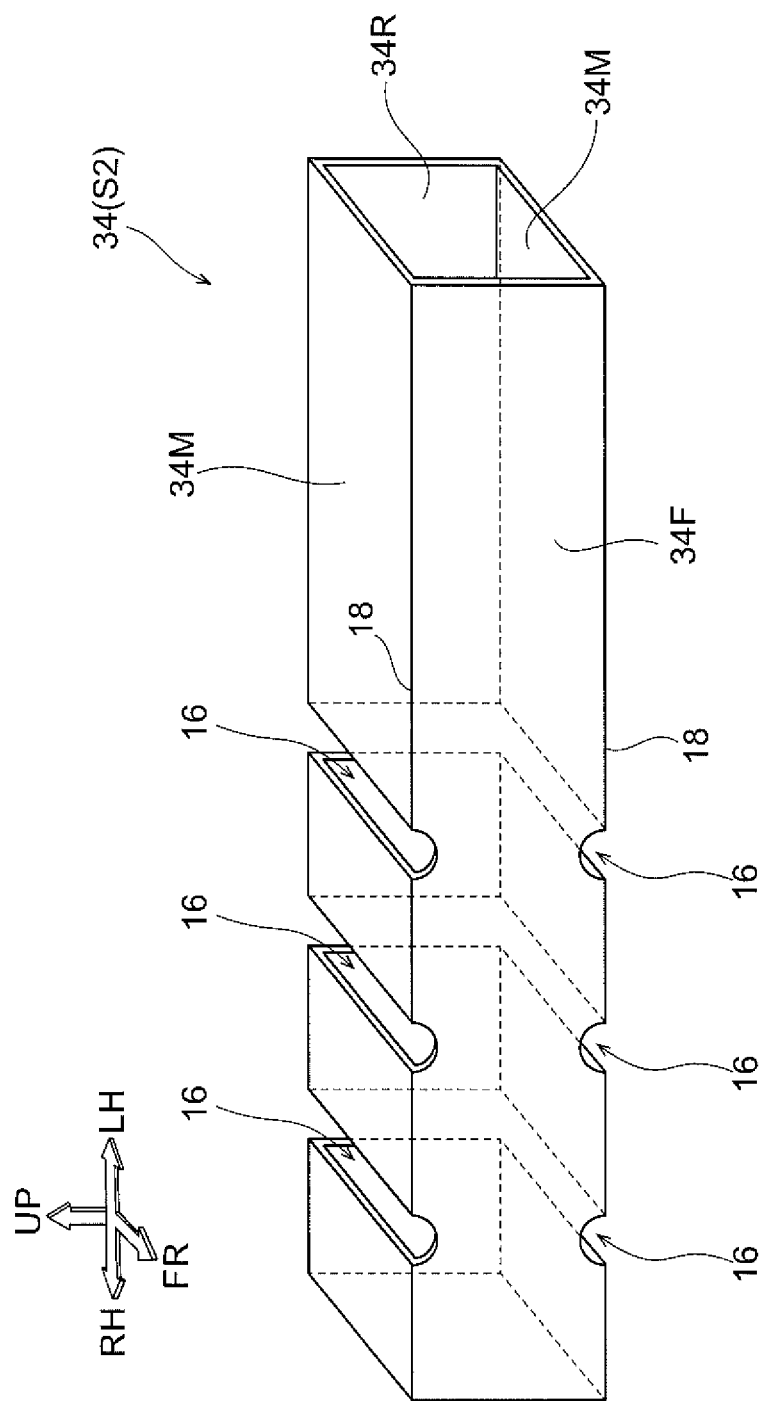
FIG. 5 is an enlarged perspective view illustrating a reinforcement member provided to a vehicle body framework structure of a second exemplary embodiment.

Explanation follows regarding a second exemplary embodiment, with reference to FIG. 5. Note that a vehicle body framework structure S2 of the second exemplary embodiment differs from that of the first exemplary embodiment only in the structure of a reinforcement member 34. Explanation is therefore only given regarding the structure of the reinforcement member 34, and other explanation is omitted.

The reinforcement member 34 of the second exemplary embodiment has a rectangular cross-section profile. Namely, the reinforcement member 34 includes a sheet shaped first contact portion 34F disposed extending in the up-down direction and the left-right direction, a pair of sheet shaped coupling portions 34M provided extending from both up-down direction end portions of the first contact portion 34F toward the rear side, and disposed extending in the front-rear direction and the left-right direction, and a sheet shaped second contact portion 34R that joins rear side end portions of the pair of coupling portions 34M together in the up-down direction and that is disposed extending in the up-down direction and the left-right direction.

Slits 16 are formed from the second contact portion 34R toward the first contact portion 34F as viewed from above. Namely, slits 16 are formed in the second contact portion 34R so as to extend in the up-down direction, with the length of the slits 16 spanning across the entire up-down direction region of the second contact portion 34R. The slits 16 extending in the front-rear direction in the pair of coupling portions 34M are formed so as to be continuous with the respective slits 16 in the second contact portion 34R. Leading ends of the slits 16 reach as far as a boundary portion (ridge lines 18) between the coupling portions 34M and the first contact portion 34F.

Operation and Advantageous Effects

The vehicle body framework structure S2 that includes the reinforcement member 34 of the second exemplary embodiment configured in this manner exhibits advantageous effects similar to those of the first exemplary embodiment. Namely, breaking or yielding of the framework member 12 is suppressed when load is input to the framework member in the direction that the pair of internal faces (front face 20, rear face 22) oppose each other, and the framework member undergoes bending deformation.

Third Exemplary Embodiment

Figure 6A:
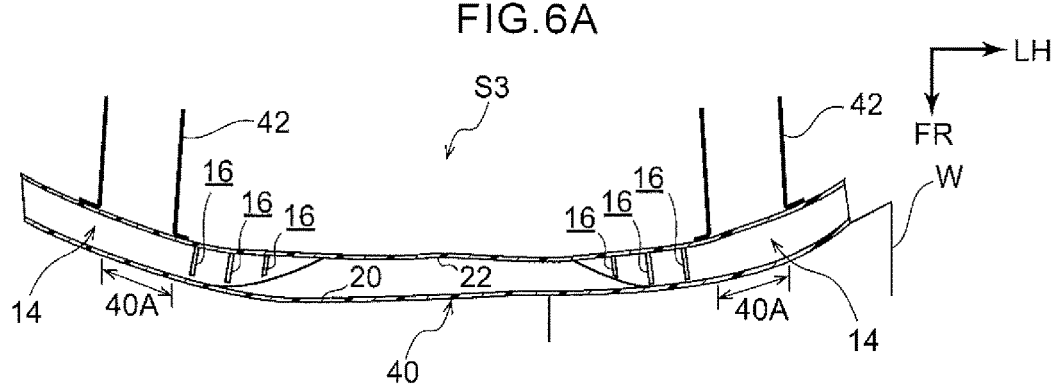
FIGS. 6A to 6C illustrate sequential states of deformation during an offset collision of a bumper reinforcement applied to a vehicle body framework structure of a third exemplary embodiment.
Figure 6B:
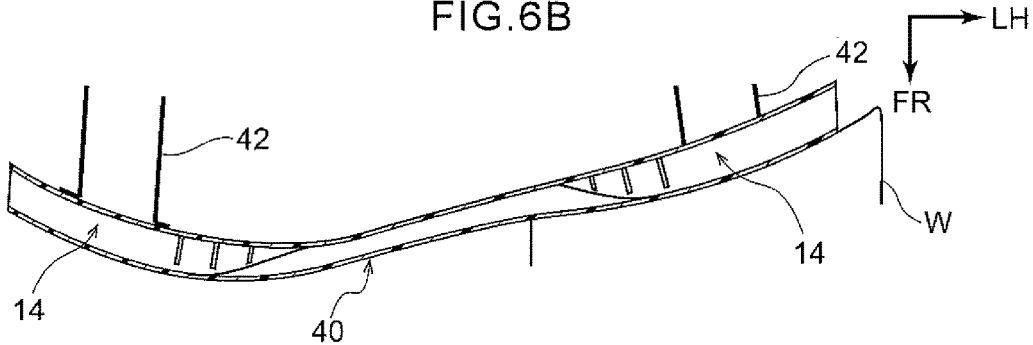
Figure 6C:
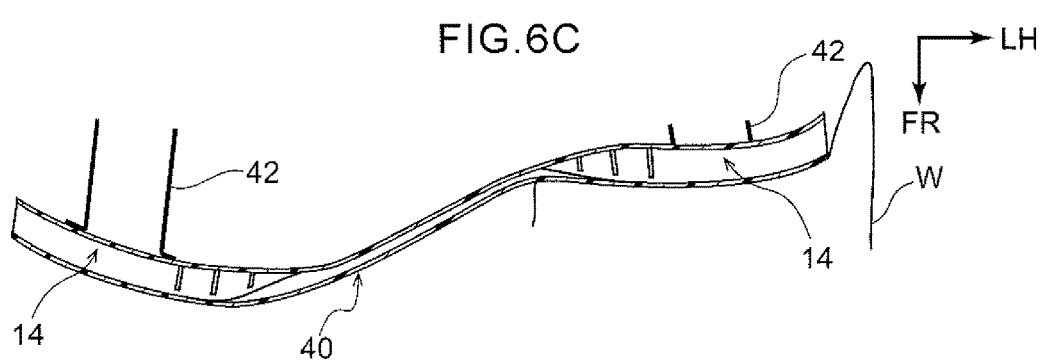

Explanation follows regarding a third exemplary embodiment, with reference to FIGS. 6A to 6C. FIG. 6A illustrates a vehicle body framework structure S3 of the third exemplary embodiment. As illustrated in FIG. 6A, in the third exemplary embodiment, the vehicle body framework structure S3 is applied with bumper reinforcement 40 provided at a vehicle front section and extending along a vehicle width direction. Note that the arrow FR and the arrow LH illustrated in FIGS. 6A to 6C respectively indicate the vehicle front direction and the vehicle left direction.

The bumper reinforcement 40 is a framework member provided extending along the vehicle width direction, and is disposed toward a vehicle rear of a front bumper (not illustrated in the drawings) of a vehicle. A pair of left and right crash boxes 42 are attached at the vehicle rear of the bumper reinforcement 40. The crash boxes 42 are disposed with their axes oriented substantially along the vehicle front-rear direction. Rear sections of the crash boxes 42 are connected to front side members (not illustrated in the drawings), these being framework members provided extending along substantially the vehicle front-rear direction. Vehicle front-rear direction rear sections of the front side members are connected to a portion of the vehicle body structure configuring a vehicle cabin. The crash boxes 42 and the front side members taken together may be viewed as being front-rear direction members provided extending along the vehicle front-rear direction on both vehicle width direction sides of a vehicle front section. The crash boxes 42 and the front side members in the present exemplary embodiment correspond to "front-rear direction members."

A pair of left and right reinforcement members 14 are provided at internal portions of the bumper reinforcement 40, disposed at both vehicle width direction ends thereof. The length of each of the reinforcement members 14 in the vehicle width direction is approximately one third of the length of the bumper reinforcement 40. The bumper reinforcement 40 has a shape inclined toward the vehicle rear side at both vehicle width direction end portions. The reinforcement members 14 are accordingly formed matching the inclined shape of the bumper reinforcement 40. The reinforcement members 14 are disposed so as to include both end positions of the bumper reinforcement 40. Cross-sectional collapse of both ends of the bumper reinforcement 40 is thereby suppressed by the reinforcement members 14.

Each of the reinforcement members 14 is disposed so as to include a portion (framework facing portions 40A) of the bumper reinforcement 40 facing a front end of the crash box 42. The slits 16 of the reinforcement members 14 are positioned further to the vehicle width direction inner side than the framework facing portions 40A.

Operation and Advantageous Effects

Next, explanation follows regarding operation and advantageous effects of the third exemplary embodiment.

In the third exemplary embodiment, in cases in which an offset collision with a collision body W has occurred, the bumper reinforcement 40 deforms as illustrated in FIG. 6A to FIG. 6C. As illustrated in FIG. 6A to FIG. 6C, in cases in which the collision body W collides with a left side section of a vehicle, a left side section of the bumper reinforcement 40 extending in the left-right direction (vehicle width direction) deforms toward the vehicle rear direction, and the bumper reinforcement 40 bends.

Cross-sectional collapse of the bumper reinforcement 40 is suppressed at the sections of the bumper reinforcement 40 provided with the reinforcement members 14. Collision load can thereby be efficiently transmitted to the crash boxes 42 and the front side members such that collision energy can be absorbed by the crash boxes 42 and the front side members.

The slits 16 of the reinforcement members 14 are positioned further to the vehicle width direction inner side than the framework facing portions 40A such that strain can be dispersed not only at vehicle width direction inside end portions of the reinforcement members 14 of the bumper reinforcement 40, but also at the portions of the bumper reinforcement 40 where the slits 16 are provided. As a result, the bumper reinforcement 40 is suppressed from breaking. Cross-sectional collapse occurs at a vehicle width direction central portion of the bumper reinforcement 40 due to compression in the front-rear direction, which also suppresses strain.

In the vehicle body framework structure S3 of the third exemplary embodiment as described above, the bumper reinforcement 40 can be suppressed from breaking, and collision load can be efficiently transmitted to the crash boxes 42 and the front side members.

Supplemental Explanation of the Exemplary Embodiments Above

In each of the exemplary embodiments described above, the cross-section profile of the framework member 12 is a rectangular shape. However, the embodiments are not limited thereto. The framework member may be formed in any hollow, elongated shape. For example, the cross-section profile of the framework member may be substantially hexagonal. Moreover, the framework member may be formed by two sheet members joined together. The material of the framework member or the reinforcement member is not limited to CFRP, and, for example, may be glass-fiber reinforced plastic (GFRP) or an aluminum alloy. The framework member and the reinforcement member may be configured by materials that are different from each other.

In each of the exemplary embodiments described above, the reinforcement members 14 and the framework member 12 are joined together using vibration welding. However, the embodiments are not limited thereto. For example, the reinforcement members and the framework member may be joined together using an adhesive. The reinforcement members and the framework member may also be joined together using welding or rivets.

In the third exemplary embodiment, explanation has been given in which an embodiment is applied to the (front) bumper reinforcement 40. However, the embodiments may be applied to various other vehicle body framework members such as rear bumper reinforcement, front pillars, center pillars, rear pillars, rockers (side sills), and roof side rails.

In the exemplary embodiments above, the reinforcement members 14 are provided at positions at both length direction end portions of the framework member 12. However, the embodiments are not limited thereto. That is to say, the reinforcement members 14 may be provided at positions not at the end sections of the framework member 12, as long as the reinforcement members 14 are provided at internal sections of the framework member 12. The positions where slits are formed in the reinforcement members are also not particularly limited. However, from the viewpoint of suppressing a concentration of stress toward the framework members at the end portions of the reinforcement members, and from the viewpoint of suppressing cross-sectional collapse, this being a basic function of the reinforcement members, is it preferable that the slits are formed in the vicinity of the end portions of the reinforcement members.

In the exemplary embodiments above, the shape of the reinforcement members 14, 34 have rectangular cross-sections or hat shaped cross-sections. However, the embodiments are not limited thereto, as long as the reinforcement member is configured including a first contact portion making contact with one internal face out of the opposing pair of internal faces of the framework member, a second contact portion making contact with another internal face out of the opposing pair of internal faces, and a coupling portion that couples the first contact portion and the second contact portion.

In the exemplary embodiments above, the leading ends 16B of the slits 16 reach as far as the boundary between the first contact portion 14F and the coupling portions 14M. However, the embodiments are not limited thereto. The leading ends of the slits may be positioned in the coupling portions without reaching as far as the first contact portion. In other words, the slits may be formed in at least the second contact portions and the coupling portions of the reinforcement member. This is due to the fact that in cases in which the depth of the slits is smaller (thinner) than the spacing at which the pair of internal faces oppose each other, the slits 16 obtain operation to disperse stress during bending deformation. Note that the depth of the slits is a dimension measured in the direction that the pair of internal faces oppose each other. In this case, each slit 16 extends from an end portion on the other internal face side toward the one internal face side, and it is preferable that the slits 16 have a depth that is greater than or equal to one fourth of the spacing at which the pair of internal faces oppose each other. Due to the depth of the slits 16 being made to be greater than or equal to one fourth of the spacing at which the pair of internal faces oppose each other, the bending rigidity of the vehicle body framework structure at a portion where the slits are formed is more effectively reduced.

In the exemplary embodiments above, the slits 16 are parallel to each other in the front-rear direction (the direction that the front face 20 and the rear face 22 oppose each other). However, the embodiments are not limited thereto. The slits may be inclined with respect to the direction that the pair of internal faces oppose each other.

What is claimed is:

1. A vehicle body framework structure comprising:
   an elongated hollow framework member; and
   a reinforcement member disposed within the hollow framework member, the reinforcement member including a first contact portion that contacts a first internal face of an opposing pair of internal faces of the framework member, a second contact portion that contacts a second internal face of the opposing pair of internal faces, and a coupling portion that couples the first contact portion to the second contact portion,
   a plurality of slits formed in at least the second contact portion and the coupling portion of the reinforcement member, each of the plurality of slits extending from an end portion on the second internal face side of the reinforcement member toward the first internal face side of the reinforcement member, each of the plurality of slits having a depth that is greater than or equal to one fourth of a spacing between the opposing pair of internal faces, wherein
   the coupling portion includes a first wall that couples an upper edge of the first contact portion to the second contact portion, and a second wall that couples a lower edge of the first contact portion to the second contact portion, and
   the plurality of slits are provided in the first and second walls of the coupling portion.

2. The vehicle body framework structure of claim 1, wherein each of the plurality of slits extends to an edge at which the first contact portion is joined to the coupling portion.

3. The vehicle body framework structure of claim 1, wherein a first end of the reinforcement member is tapered.

4. The vehicle body framework structure of claim 3, wherein each of the plurality of slits is provided at the tapered first end of the reinforcement member.

5. The vehicle body framework structure of claim 1, wherein the hollow framework member has a cross-section that is open at one side.

6. The vehicle body framework structure of claim 1, wherein the hollow framework member has a rectangular cross-section.

7. A vehicle body framework structure comprising:
   an elongated hollow framework member; and
   a reinforcement member disposed within the hollow framework member, the reinforcement member including a first contact portion that contacts a first internal face of an opposing pair of internal faces of the framework member, a second contact portion that contacts a second internal face of the opposing pair of internal faces, and a coupling portion that couples the first contact portion to the second contact portion,
   at least one slit formed in at least the second contact portion and the coupling portion of the reinforcement member, the at least one slit extending from an end portion on the second internal face side of the reinforcement member toward the first internal face side of the reinforcement member, the at least one slit having a depth that is greater than or equal to one fourth of a spacing between the opposing pair of internal faces, wherein
   a pair of the reinforcement members are provided within the hollow framework member such that a first one of the pair of reinforcement members is disposed at a first end of the hollow framework member and a second one of the pair of reinforcement members is disposed at a second end of the hollow framework member.

8. The vehicle body framework structure of claim 7, wherein
   the first and second ones of the reinforcement members are spaced from each other.

9. The vehicle body framework structure of claim 7, wherein
   the at least one slit of each of the reinforcement members is formed at an end of the reinforcement member located closer to a central portion of the hollow framework member.

10. A vehicle body framework structure comprising:
    an elongated hollow framework member; and
    a reinforcement member disposed within the hollow framework member, the reinforcement member including a first contact portion that contacts a first internal face of an opposing pair of internal faces of the framework member, a second contact portion that contacts a second internal face of the opposing pair of internal faces, and a coupling portion that couples the first contact portion to the second contact portion,
    at least one slit formed in at least the second contact portion and the coupling portion of the reinforcement member, the at least one slit extending from an end portion on the second internal face side of the reinforcement member toward the first internal face side of the reinforcement member, the at least one slit having a depth that is greater than or equal to one fourth of a spacing between the opposing pair of internal faces, wherein:
    the hollow framework member is a bumper reinforcement attached to front ends of a pair of front-rear direction members extending along a vehicle front-rear direction at both vehicle width direction sides of a vehicle front section, the bumper reinforcement extending along a vehicle width direction;
    a pair of the reinforcement members are provided such that, in each of the reinforcement members, the first contact portion faces a vehicle front direction and the second contact portion faces a vehicle rear direction, and each of the reinforcement members includes a portion present at one of the two respective vehicle width direction ends of the bumper reinforcement and facing toward a front end of the respective front-rear direction member; and
    the at least one slit of each of the reinforcement members is formed further toward a vehicle width direction inner side than each of the respective portions facing toward the front end of the respective front-rear direction member.

11. A vehicle body framework structure comprising:
    an elongated hollow framework member; and
    a reinforcement member disposed within the hollow framework member, the reinforcement member including a first wall that contacts a first internal face of an opposing pair of internal faces of the framework member, a second wall that contacts a second internal face of the opposing pair of internal faces, and a coupling wall that extends between and couples the first wall to the second wall, a plurality of slits formed in at least the second wall and the coupling wall of the reinforcement member, each of the plurality of slits extending from the second wall toward the first wall, each of the plurality of slits extending for a distance that is greater than or equal to one fourth of a spacing between the opposing pair of internal faces of the hollow framework member, wherein the coupling wall includes a first portion that couples an upper edge of the first wall to the second wall, and a second portion that couples a lower edge of the first wall to the second wall, and the plurality of slits are provided in the first and second portions of the coupling wall.

12. The vehicle body framework structure of claim 11, wherein each of the plurality of slits extends to an edge at which the first wall is joined to the coupling wall.

13. The vehicle body framework structure of claim 11, wherein a first end of the reinforcement member is tapered.

14. The vehicle body framework structure of claim 13, wherein each of the plurality of slits is provided at the tapered first end of the reinforcement member.

15. A vehicle body framework structure comprising:
an elongated hollow framework member; and
a reinforcement member disposed within the hollow framework member, the reinforcement member including a first wall that contacts a first internal face of an opposing pair of internal faces of the framework member, a second wall that contacts a second internal face of the opposing pair of internal faces, and a coupling wall that extends between and couples the first wall to the second wall, at least one slit formed in at least the second wall and the coupling wall of the reinforcement member, the at least one slit extending from the second wall toward the first wall, the at least one slit extending for a distance that is greater than or equal to one fourth of a spacing between the opposing pair of internal faces of the hollow framework member, wherein a pair of the reinforcement members are provided within the hollow framework member such that a first one of the pair of reinforcement members is disposed at a first end of the hollow framework member and a second one of the pair of reinforcement members is disposed at a second end of the hollow framework member.

* * * * *